United States Patent
Kettley et al.

(10) Patent No.: US 6,842,763 B2
(45) Date of Patent: Jan. 11, 2005

(54) METHOD AND APPARATUS FOR IMPROVING MESSAGE AVAILABILITY IN A SUBSYSTEM WHICH SUPPORTS SHARED MESSAGE QUEUES

(75) Inventors: Paul Kettley, Winchester (GB); Peter Siddall, Romsey (GB); James H. Warnes, Hopewell Jct., NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 09/912,279

(22) Filed: Jul. 24, 2001

(65) Prior Publication Data

US 2002/0059316 A1 May 16, 2002

Related U.S. Application Data (60) Provisional application No. 60/220,685, filed on Jul. 25, 2000.

(51) Int. Cl.$^7$ ............................................... G06F 17/30
(52) U.S. Cl. ................. 707/200; 707/2; 707/3; 707/8; 707/10; 707/101; 707/103 R; 707/202; 709/213
(58) Field of Search .............................. 707/2, 3, 8, 10, 707/101, 102, 103 R, 201, 202; 709/101, 213, 217, 237, 219, 224, 225, 226, 227, 236, 315

(56) References Cited

U.S. PATENT DOCUMENTS

| | | | | | |
|---|---|---|---|---|---|
| 6,092,086 A | * | 7/2000 | Martin et al. | ................ | 707/202 |
| 6,353,834 B1 | * | 3/2002 | Wong et al. | ................ | 707/202 |
| 6,434,605 B1 | * | 8/2002 | Faulkner et al. | ............ | 709/213 |

* cited by examiner

*Primary Examiner*—Alford Kindred
*Assistant Examiner*—Fred Ehichioya
(74) *Attorney, Agent, or Firm*—George E. Grosser

(57) ABSTRACT

The invention relates to communicating message data between application programs, the message data relating to units of work performed by the application programs. A plurality of message queuing subsystems interface to the application programs and are coupled together through a coupling facility. The message data is communicated in shared queues between the message queuing subsystems by means of data structures contained in the coupling facility. The data structures include an administrative structure listing unit of work descriptors describing operations performed by the queuing subsystems on a shared queue. A connection failure between a queuing subsystem and the shared queue is notified to the remaining queuing subsystems connected to the shared queue. The remaining queuing subsystems interrogate the listed work descriptors so as to identify and to share between them the units of work active in the failed connection, and each of the remaining subsystems recovers its share of the units of work active in the failed connection.

20 Claims, 4 Drawing Sheets

APPLICATION STRUCTURE

FIGURE 4

ADMINISTRATIVE STRUCTURE

METHOD AND APPARATUS FOR IMPROVING MESSAGE AVAILABILITY IN A SUBSYSTEM WHICH SUPPORTS SHARED MESSAGE QUEUES

CROSS REFERENCES TO RELATED PATENT APPLICATIONS

This application claims priority and all other benefits under 35 U.S.C 120 of prior filed co-pending U.S. provisional patent application U.S. Ser. No. 60/220,685, filed Jul. 25, 2000, which is incorporated herein by reference.

This application is related to the subject matter of the following co-pending patent applications, each of which is assigned to the same assignee as this application and each of which is incorporated herein by reference:

D. A. Elko et al., U.S. Ser. No. 09/677,339, filed Oct. 2, 2000, entitled "METHOD AND APPARATUS FOR PROCESSING A LIST STRUCTURE";

D. A. Elko et al, U.S. Ser. No. 09/677,339, filed Oct. 2, 2000, entitled "METHOD AND APPARATUS FOR IMPLEMENTING A SHARED MESSAGE QUEUE USING A LIST STRUCTURE";

P. Kettley et al., U.S. Ser. No. 09/605,589, filed Jun. 28, 2000, entitled "METHOD AND APPARATUS FOR OPERATING A COMPUTER SYSTEM TO ENABLE A RESTART";

P. Kettley et al., U.S. Ser. No. 60/219,889, filed Jul. 21, 2000, entitled "IMPLEMENTING MQI INDEXED QUEUE SUPPORT USING COUPLING FACILITY LIST STRUCTURES".

FIELD OF INVENTION

The present invention relates to methods and apparatus for recovery from failures affecting a resource manager within a data processing network, and has particular applicability to the field of communicating message data between application programs via shared message queues and to the resolution of a failed resource manager's units of work by other active resource managers to improve message availability.

BACKGROUND OF THE INVENTION

In the communication through a computer network of message data between application programs it is known to transmit the messages by means of resource managers such as queue managers which interface to the application programs through a message queueing interface that is invoked by the application programs. In contemporary data processing environments, it is commonplace for the computer network to connect a client application program that has a task to be performed to one or more transaction-oriented resource manager programs that will undertake the task. In this environment, the client queues an input message through a queuing subsystem to a target system to request processing and when the processing is complete a return message is queued for transmission back to the client.

U.S. Pat. No. 5,452,430 describes a data processing system for the storage of persistent and non-persistent data in a queue and a method for the storage of data which is required to survive a system failure. The method involves receiving persistent and non-persistent data to be stored in a queue, then marking the data in time sequence order before storing the persistent data in a first set of data pages and the non-persistent data in a second set of data pages. Upon receiving a request to remove data from the queue, both the first and second pages are checked and the data is removed from the queue in time sequence order. A log is created to enable recovery in the event of failure and restart of the queue.

It is also known from U.S. Pat. Nos. 5,797,005 and 5,887,168 to provide a system allowing messages to be processed by any of a plurality of data processing systems in a data processing environment. A shared queue is provided to store incoming messages from message queuing subsystems for processing by one of the plurality of data processing systems. A common queue server receives and queues the messages from a subsystem onto the shared queue so that they can be retrieved by a system having available capacity to process the messages. A system having available capacity retrieves the queued message, performs the necessary processing and places an appropriate response message back on the shared queue. Thus, the shared queue stores messages sent in either direction between clients requesting processing and the data processing systems that perform the processing. Because the messages are enqueued onto the shared queue, the messages can be processed by an application running on any of a plurality of systems having access to the queue. Automatic workload sharing and processing redundancy is provided by this arrangement. If a particular application that is processing a message fails, another application can retrieve that message from the shared queue and perform the processing without the client having to wait for the original application to be restarted.

SUMMARY OF THE INVENTION

It is the aim of the present invention to improve recovery from a connection failure between a resource manager such as a queuing subsystem and a shared resource such as a shared queue, such failure being caused either by communications link failure, or failure of the computer system or of a computer program comprising the resource manager.

In a first aspect of the present invention, there is provided a method for recovering from failures affecting a resource manager within a group of resource managers, wherein the resource managers within the group have access to a shared resource via which remote resource managers communicate with the resource managers within the group, the shared resource including data storage structures to which resource managers within said group connect to send and receive communications, the method comprising:

storing, within a first data storage structure of the shared resource, unit of work descriptors for operations performed in relation to said shared resource by the resource managers in said group;

sending a notification of a connection failure between a second data storage structure of the shared resource and a first resource manager within said group, the notification being sent to the remaining resource managers within the group which are connected to the second data storage structure;

one or more of said remaining resource managers accessing said first data storage structure and analysing the unit of work descriptors to identify the units of work relating to the second data storage structure that were being performed by the first resource manager when the connection failure occurred; and said one or more remaining resource managers recovering the identified units of work.

In one embodiment, there is provided a method of communicating information relating the state of units of work and the messages which form part of the unit of work between message queuing subsystems coupled together through a coupling facility, the method comprising: communicating the message data in at least one shared queue between the message queuing subsystems by means of data structures contained in the coupling facility; notifying a connection failure between a queuing subsystem and the coupling facility data structure containing the shared queue, the notification being provided to the remaining queuing subsystems in communication with the coupling facility; including, within the data structure containing the shared queue, information describing which shared queues within the structure are in use from a particular queuing subsystem; including within the said data structures an administrative structure listing unit of work descriptors describing operations performed by the queuing subsystems on those shared queues which are contained within a certain coupling facility data structure; including with the message data stored in the coupling facility data structures, a key to enable retrieval of the message data, one range of key values identifying a message as committed, a further range of key values identifying a message as uncommitted, and a third range of key values identifying the message state as indeterminate; after a connection failure, employing the said remaining queuing subsystems in parallel to interrogate the listed work descriptors so as to identify and to share between them the recovery of units of work active in the subsystem whose connection to the coupling facility has failed, and employing each of the said remaining subsystems to recover its share of the units of work active in the queuing subsystem whose connection to the coupling facility has failed.

After all unit of work descriptors are processed, a second phase of recovery is initiated in which the said remaining subsystems find all inflight messages read and written by the failing queuing subsystem and roll them back. These inflight messages are found without reference to the failed queuing subsystem's logs.

In a second aspect of the invention, there is provided a method for recovering from failures affecting a resource manager within a group of resource managers, wherein the resource managers within the group have access to a shared resource, the shared resource including data storage structures to which resource managers within said group connect to perform operations in relation to data held in said shared resource, the method comprising:

storing, within a first data storage structure of the shared resource, unit of work descriptors for operations performed by the resource managers in said group in relation to data held in said shared resource;

sending a notification of a connection failure between a second data storage structure of the shared resource and a first resource manager within said group, the notification being sent to the remaining resource managers within the group which are connected to the second data storage structure;

one or more of said remaining resource managers accessing said first data storage structure and analysing the unit of work descriptors to identify the units of work relating to the second data storage structure that were being performed by the first resource manager when the connection failure occurred; and said one or more remaining resource managers recovering the identified units of work.

In a third aspect of the invention, there is provided a distributed data processing system including:

a plurality of resource managers;

a shared access resource including data storage structures to which the resource managers connect to send and receive communications to and from remote resource managers, the shared access resource including:

means for storing, within a first data storage structure of the shared resource, unit of work descriptors for operations performed in relation to said shared resource by the resource managers in said plurality; and means for sending a notification of a connection failure between a second data storage structure of the shared resource and a first resource manager within said plurality, the notification being sent to the remaining resource managers within the plurality which are connected to the second data storage structure;

wherein said remaining resource managers include:

means for accessing said first data storage structure and analysing the unit of work descriptors to identify the units of work relating to the second data storage structure that were being performed by the first resource manager when the connection failure occurred; and means for recovering the identified units of work.

In a further aspect of the invention, there is provided a computer program product comprising program code recorded on a machine-readable recording medium, the program code comprising the following set of components:

a plurality of resource managers;

a shared access resource manager including program code for managing storage and retrieval of data within data storage structures to which the resource managers connect to send and receive communications to and from remote resource managers, the shared access resource manager including:

means for storing, within a first data storage structure of the shared resource, unit of work descriptors for operations performed in relation to said shared resource by the resource managers in said plurality; and means for sending a notification of a connection failure between a second data storage structure of the shared resource and a first resource manager within said plurality, the notification being sent to the remaining resource managers within the plurality which are connected to the second data storage structure;

wherein said remaining resource managers include:

means for accessing said first data storage structure and analysing the unit of work descriptors to identify the units of work relating to the second data storage structure that were being performed by the first resource manager when the connection failure occurred; and means for recovering the identified units of work.

According to another embodiment of the invention, there is provided a communication system to communicate information relating the state of units of work and the messages that form part of the unit of work between message queueing subsystems, the system comprising: a coupling facility to communicate the message data between the message queuing subsystems in at least one shared queue by means of data structures included within the coupling facility; means to notify a connection failure between a queuing subsystem and the coupling facility data structure containing the shared queue, the notification being provided to the remaining queuing subsystems in communication with the coupling facility; the data structure containing the shared queue including information describing which shared queues within the structure are in use from a particular queuing subsystem; an administrative structure within the data structures listing unit of work descriptors describing operations performed by the queuing subsystems on those shared queues which are contained within a certain coupling facility data structure; the message data stored in the coupling facility data structures including a key to enable retrieval of the message data, one range of key values identifying a message as committed, a further range of key values identifying a message as uncommitted, and a third range of key values identifying the message data as indeterminate; means operative, after a connection failure, to employ the said remaining queueing subsystems in parallel to interrogate the listed work descriptors so as to identify and to share between them the recovery of units of work active in the subsystem whose connection to the coupling facility has failed and to employ each of the said remaining subsystems to recover its share of the units of work active in the queueing subsystem whose connection to the coupling facility has failed.

BRIEF DESCRIPTION OF THE DRAWINGS

Embodiments of the invention will now be described in more detail, by way of example, with reference to the accompanying drawings in which.

DETAILED DESCRIPTION OF THE PREFERRED EMBODIMENTS

The present invention is directed to methods and systems to communicate message data between application programs connected to a system and to recover units of work, consisting of messages read and written, owned by the failing queuing subsystem in parallel by surviving queuing subsystems without access to logs maintained by the failed queuing subsystem.

Figure 1:
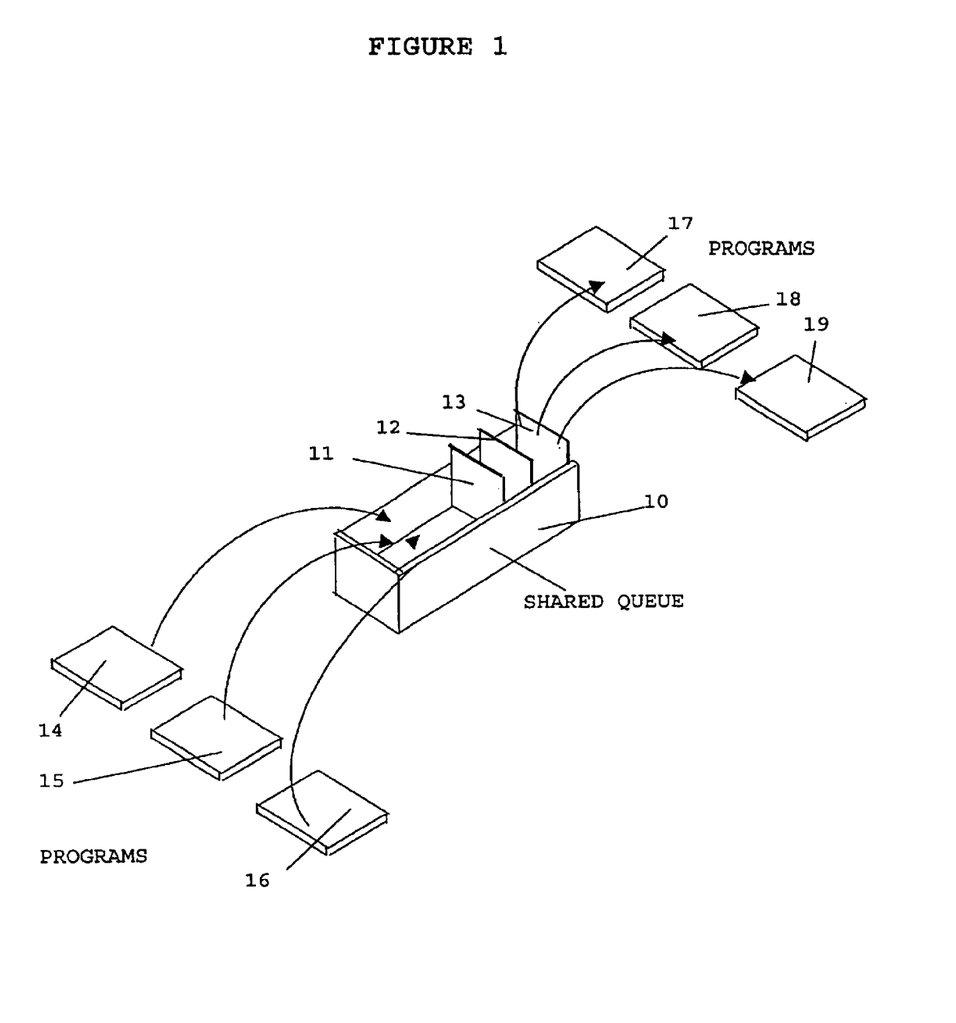
FIG. 1 shows a message queue shared between a plurality of application programs.

FIG. 1 shows a shared queue 10 which receives messages 11, 12, 13 put onto the queue by application programs 14, 15, 16. Programs 17, 18 and 19 get messages from the shared queue 10. The programs 14, 15 and 16 represent client application programs including instructions for performing client-related tasks. When a client program has a transaction to be processed it places a message on the shared queue 10 to be retrieved by one of the programs 17, 18 and 19. When one of the programs 17, 18 and 19 gets a message, it processes the message and places a response on the shared queue 10. Each message remains on the queue until it is retrieved. It will be understood that the diagram of FIG. 1 has been simplified for ease of explanation. In practice, a network of connections could be used to communicate messages between the programs requiring to communicate with one another and whilst only one shared queue 10 has been shown for simplicity of explanation, in practice a number of such shared queues are used to pass messages between the communicating programs.

Figure 2:
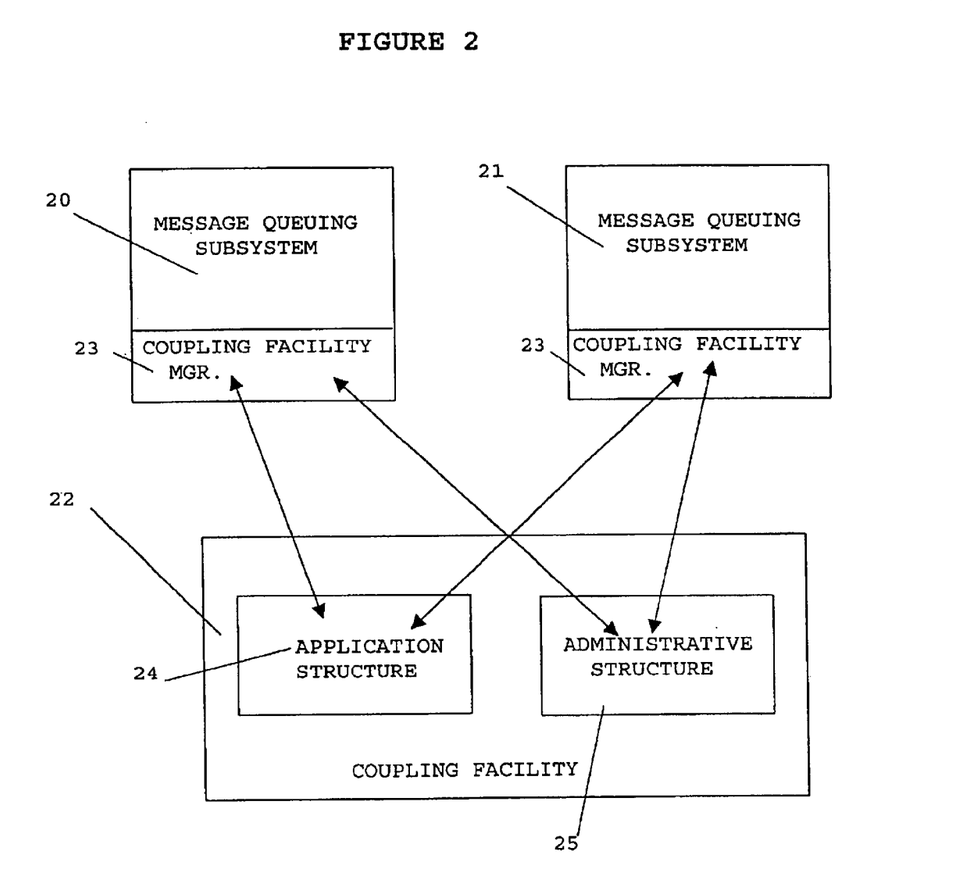
FIG. 2 shows a message queuing system according to the present invention to communicate message data between application programs connected to the system.

Referring now to FIG. 2, message queuing subsystems 20 and 21 are provided to interface the programs 14, 15, 16, 17, 18 and 19 to shared queue 10. Whilst only two message queuing subsystems have been shown in FIG. 2, it will be apparent to one skilled in the art that the number of subsystems may vary. A coupling facility 22 is provided to couple the message queuing subsystems 20 and 21. A coupling facility manager component 23 is included in each message queuing subsystem to interface to the coupling facility 22 through the use of services provided by the operating system.

Each application program 14, 15, 16, 17, 18 and 19 operates on a computer platform comprising a computer and an operating system. The computer typically includes various hardware components, such as one or more central processing units (CPU), a random access memory (RAM) and an input/output (I/O) interface. The message queue subsystems 20 and 21 also run on a computer platform comprising a computer and an operating system and connected to interface to the application programs 14, 15, 16, 17, 18 and 19 either locally or through a communication network which may be implemented as a local area network (LAN) or a wide area network (WAN) for example.

The coupling facility 22 runs on a further computer platform including a computer and an operating system. A computer program product comprising instructions stored on a computer readable medium enables the computer to execute the features of the coupling facility as will be discussed below. The coupling facility sets aside an area of storage to hold the messages in the shared queue 10 on their way from one program to another. The communications link between the coupling facility 22 and the connecting computer systems running the message queuing subsystems 20, 21 is managed by a component (referred to as XES) of the operating system of each of the connecting computer systems. The message queuing subsystems 20,21 and the coupling facility 22 may all run on the same computer or same computer platform.

The XES operating system component provides functions that allow the message queuing subsystems 20 and 21 to allocate data structures within the coupling facility 22 and to connect to and manipulate these data structures. The XES component also provides status information concerning the status of concurrent connections to the same data structures within the coupling facility 22. The coupling facility managers 23 move data between the coupling facility and the message queuing subsystems 20 and 21. Through the use of the XES services, the coupling facility manager component of the queuing subsystem connects to a single administrative structure 25 used for communicating unit of work information between the queuing subsystems, and one or more application structures 24 to hold the application message data. Each queuing subsystem sharing message queues will have a connection to the administrative structure and connections to the application structures which hold message data associated with the shared queues being operated on by applications attached via that queuing subsystem. These connections are indicated by the arrows in FIG. 2.

Figure 3:
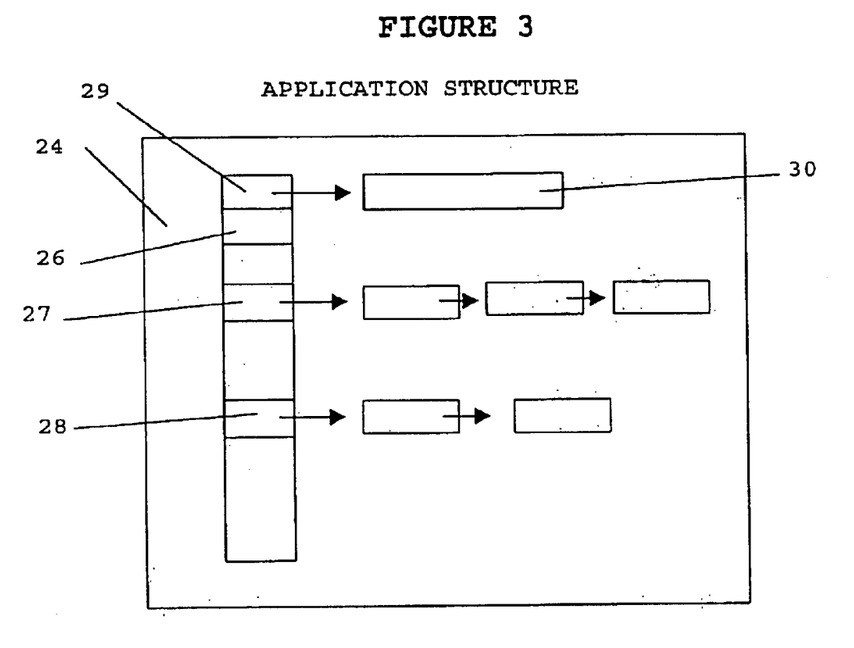
FIG. 3 shows an application structure included within the system of FIG. 2.

Referring now to FIG. 3, the application structure 24 will be described. The application structure contains an array of list headers 26. Each of the list headers 26 may have anchored to it zero or more list entries that contain message data put by an application interfacing with a queuing subsystem to a shared queue. The list entries each have a key and the list entries are listed under each list header in the order of their keys. The construction of the keys and mechanism for storing and retrieving messages using these is described in commonly assigned U.S. patent application Ser. No. 09/677,341, which is incorporated herein by reference (IBM docket POU920000042). U.S. Ser. No. 09/677, 341 describes how keys represent committed, uncommitted, or 'indeterminate' state messages. The keys also specify the queue manager (queueing subsystem) which put the message on the queue and/or of the queue manager which performed a get operation to retrieve the message, and a timestamp of when the message arrived on the queue. The lowest keyed entry in a list is at the head of its list and the highest keyed entry at the tail of its list. A first set 27 of the list headers is a set of shared queue list headers corresponding respectively to the shared queues 10. A second set 28 of the list headers will be referred to as uncommitted get queue list headers. Each queuing subsystem connected to a coupling facility data structure 22 has its own unique uncommitted get queue. Making entries to the uncommitted get queue lists is explained below.

A list header 29 at the top of the array of list headers has a list of data representing a list header information map 30. For each message queuing subsystem, the information map 30 identifies the shared queue list headers in the array 27 currently being used by that message queuing subsystem. Each queuing subsystem has its own list header information map (LHIM). The LHIM is bound to a specific queuing subsystem based on the LHIM's list entry key. There is a bit string in the LHIM and a one to one correspondence between bits in the bitstring and list headers in the data structure such that, if bit 1 is set on, then the queuing subsystem which owns the LHIM has an interest in the shared queue which maps to list header 1 and so on. The coupling facility manager 23 of each message queuing subsystem maintains the entries in the information map 30 for that message queuing subsystem. When a program puts a message onto a shared queue, the coupling facility manager 23 interfacing to that program moves the message data from private storage in the message queuing subsystem to a list entry with a key value in the uncommitted key range in the coupling facility data structure and associates it with the list header in the array 27 identified with that shared queue. When a program gets a message from a shared queue, the coupling facility manager 23 finds the list entry with the lowest key value in the committed range associated with the list header in the array 27 corresponding to the shared queue and copies the message data into private storage in the message queuing subsystem. At the same time, the list entry is dissociated from the list from which it was copied and reassociated with the uncommitted get queue list corresponding to the message queuing subsystem, and the list entry key value is changed to a value in the uncommitted range. Thus messages forming part of an uncommitted unit of work have list entry key values in the uncommitted range.

So far, only simple put and get operations have been described. In practice, an application program will perform a series of linked operations to perform a unit of work. A unit of work is a term of art that refers to a recoverable series of operations performed by an application between two points of consistency. A unit of work begins when a transaction starts or after a user-requested synchronisation point (syncpoint). It ends either at a user-requested syncpoint or at the end of a transaction. A unit of work may involve an application performing a set of operations such as getting a message from a queue, making a database entry based on the contents of the message and putting a different message back onto a queue indicating the results of the database operation. In a cash machine application for example, the cash machine may send a message indicating the withdrawal of a particular amount of cash, the computer at the bank will retrieve the message, debit the appropriate account and send back the current balance. In real life, a program will want either all or none of these steps to occur. So if the database update fails, for example, the original request message should be put back into the queue so that another program may try again.

When the thread of operations that are executed in a unit of work reaches a synchronisation point, they can either be done (known in the art as committed) or undone (known in the art as backed-out or aborted). When an application is part way through the thread of operations in a unit of work, it is known as inflight so that if it abnormally terminates, the message queuing subsystem can detect this and is able to back-out the updates made by the application. The sequence of operations may then be retried from the beginning by another program.

A unit of work may be also be in a fourth state known in the art as 'indoubt'. The 'indoubt' state is associated with two phase commit protocols and indicates that the queuing subsystem is unable to make the decision as to whether the unit of work should be committed or backed out as the unit of work (typically) involves other resource managers, such as a database, and must be coordinated by an external syncpoint manager.

Figure 4:
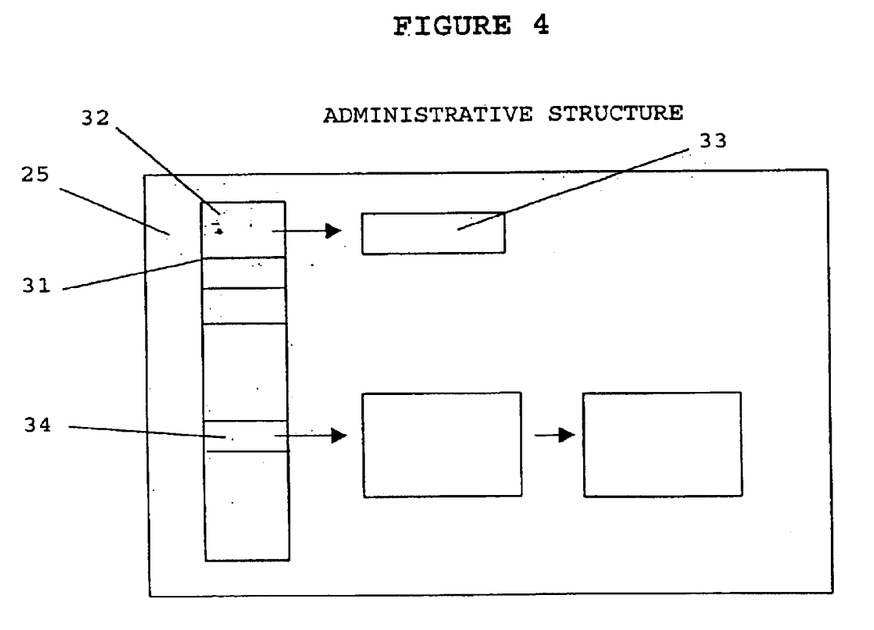
FIG. 4 shows an administrative structure included within the system of FIG. 2.

The present invention aims to provide sufficient information in the shared storage within the coupling facility 22 that if one of the message queuing subsystems in one computer fails, another message queuing subsystem in another computer is able to back-out or commit the units of work in progress on the failed computer at the time of failure. FIG. 4 shows the administrative structure 25 that is used to provide the shared storage for information about operations performed on shared queues in units of work. For units of work progressing beyond the inflight state, a unit of work descriptor is built for each coupling facility list structure accessed. The unit of work descriptor (UOWD) identifies the list entries containing message data which have been affected by this unit of work in the corresponding coupling facility list structure, and the operation, either a get or put, which has been performed. For example, if the unit of work has accessed multiple coupling facility structures (because for example shared queue 1 maps to structure 1 and shared queue maps to structure 2 and the application did a put to each queue) multiple unit of work descriptors are written—one (or more) for each coupling facility structure accessed by the unit of work. In this case, each unit of work descriptor points to a summary list entry that identifies the set of coupling facility structures the unit of work accessed. For a commit operation, inflight messages put in the unit of work have their list entry key value modified so that it has a value in the committed range, and inflight messages touched by a get operation are deleted from the uncommitted get list header. For a backout operation, inflight messages put in the unit of work are deleted, and inflight messages got in the unit of work are moved back from the uncommitted get queue to the list header from which they had been gotten, and the key value of the list header changed from uncommitted back to a value in the committed range. It is clear that with information about which list entries have been affected in the unit of work, and the operation (put or get) performed, these operations can be performed by a different queuing subsystem after a failure. As an optimization, no information is kept in the administrative structure about inflight units of work.

The administrative structure 25 has an array 31 of list headers. Each of the list headers may have a list of data entries associated with it in the manner already described with reference to the application structure of FIG. 3. The array 31 also includes unit of work list headers 34. Each message queuing subsystem is assigned a unit of work list header 34. The UOWD is written into the administrative structure just before the syncpoint operation and associated with the unit of work list header 34 of the queueing subsystem on which the unit of work has been performed. After the syncpoint operation has been performed the UOWD is no longer required and is deleted.

Figure 5:
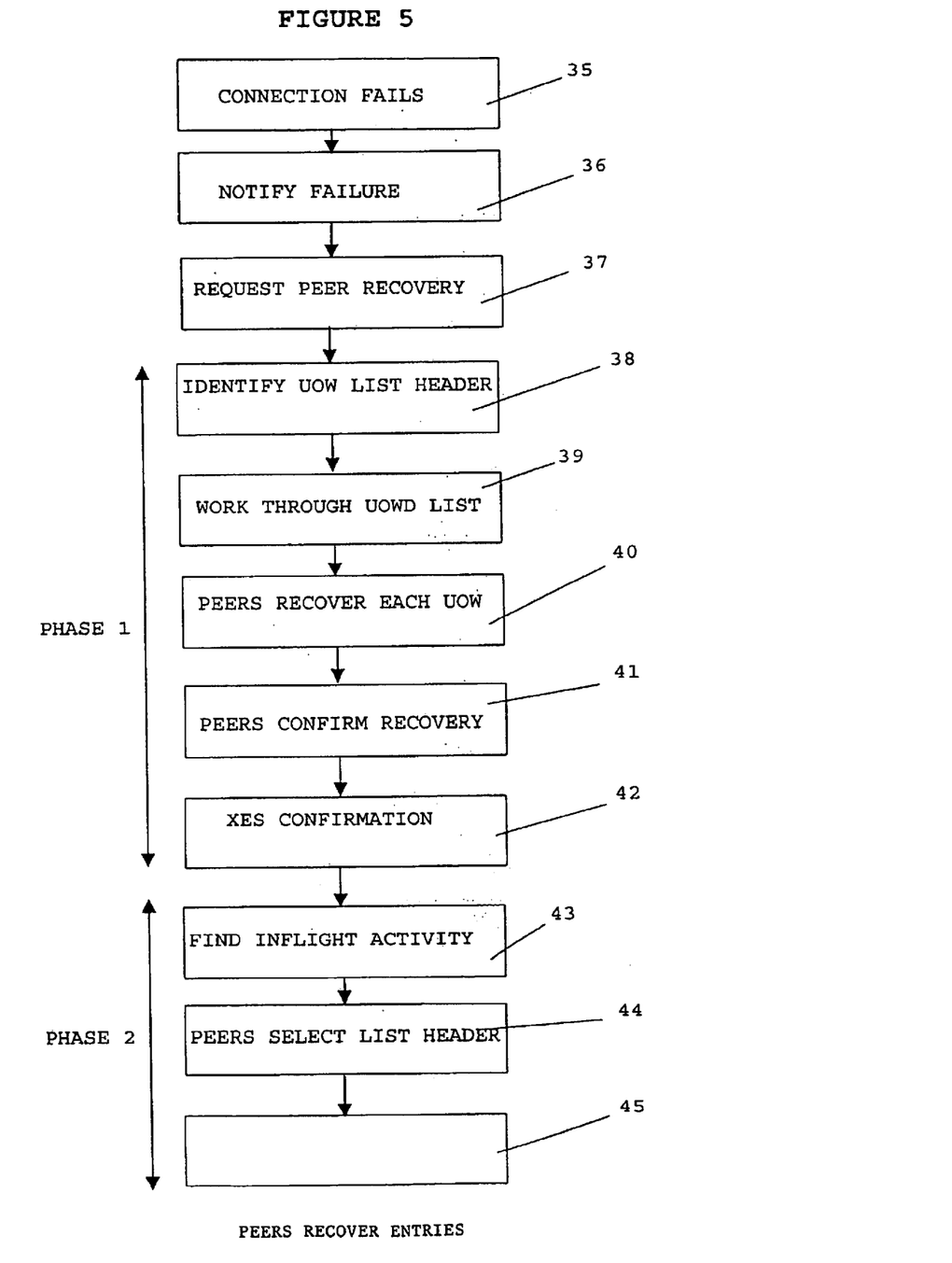
FIG. 5 shows steps performed in recovering units of work active in a failed connection to a shared queue.

Referring now to FIG. 5, the operations of the message queuing subsystems 20 and 21 and the coupling facility 22 will be described in relation to the recovery of units of work after the failure of a connection between the queuing subsystem and the application structure of FIG. 3. In a first step 35, a connection to an application structure in a coupling facility fails. The XES program issues in step 36 a notification of the failure to any remaining connectors to the same application structure. The remaining connectors may be referred to as peer connectors.

Each peer, on receiving a notification from XES that a connection failure has occurred, attempts to start peer recovery by using XES services to broadcast to all peers an instruction to start peer recovery. XES will ensure that only one of these requests is successful and that all peers receive such a request. Peer recovery takes place in two phases, in the first phase units of recovery for the failed connection which are represented by UOWDs associated with the unit of work list header for the queuing subsystem whose connection has failed are recovered. In the second phase, inflight units of work are recovered. Again XES services are used to ensure that phase 1 has completed in all peers before phase 2 can start in any peers.

Each peer receives in step 37 a request to start peer recovery for the failed connector for the application structure. The process enters a phase 1 of recovery in which the unit of work list header for the failed connector is established in step 38 from information contained in the connection identifier for the failed connection which is notified to the surviving connectors by XES. In step 39 the peers work in parallel through the units of work descriptors in the list for the failed connector and each selects a unit of work for recovery (when a peer finds there are no further units of work to recover, it has completed phase 1). The ownership and recovery of an individual unit of work is effected through the version number mechanism described in the attached design documentation. In step 40 each peer recovers the unit of work that it has selected in its entirety on its own and then makes a selection of the next unit of work that is available for recovery (i.e. not selected and owned by another peer). The recovery of a unit of work involves completing the commit for units of work marked in-commit, backing out units of work marked in-abort, or moving to an 'indeterminate' key range, the messages in a unit of work marked as in-doubt. The peers thus co-operate in parallel together, selecting a single unit of work each at a time for recovery and working down the list of unit of work descriptors in the list. When there are no further unit of work descriptors associated with the queuing subsystem whose connection has failed left to process, a peer indicates that it has finished phase 1 of recovery. In step 41 each peer issues a confirmation to the XES program that it has completed phase 1 of recovery and in step 42 the XES program issues to all the peers a notification when all the peers have confirmed the completion of phase 1 of recovery so that the peers can all start phase 2.

In a second phase of recovery, the recovery work to be performed is BACK-OUT of inflight activity. In step 43, each peer refers to the information map 30 in the application structure to find the shared queue list headers that may have inflight activity. In step 44, each peer selects a list header for inflight recovery and prevents other peers from also using it through the use of an ENQ (serialization mechanism). Inflight recovery involves deleting list entries with a key in the uncommitted keyrange which were put by the queuing subsystem whose connection to the coupling facility has failed, and finding list entries with a key in the uncommitted key range on the uncommitted get queue and which were originally associated with the shared queue being processed and moving them back to that list header, at the same time, changing the key value of the list entry to be in the committed key range. In step 45, each peer recovers the entries under the selected list header entirely on its own and then deals with the next available list header. The peers co-operate together in parallel to each recover a list header at a time. When a peer has recovered a list header, it updates the entry in the information map 30 to reset the interest of the failed connection in that list header. At the end of phase 2, the information map 30 shows that the failed connection has no interest in any of the list headers. No further recovery work can be performed by peers, although on restart of the failed queueing subsystem there may be indoubt messages whose list entries had been moved to keys in the 'indeterminate' key range by peer recovery and which can be either committed or backed out after reference to the restarting queuing subsystem's log or the external syncpoint manager. Each peer notifies XES that it has completed phase 2.

Because of the parallel nature of the recovery performed by the peer connectors, it is possible to undertake the recovery of more than one failed connection to a shared queue. Thus if a connection A fails and peer connections B and C survive, the peer connections B and C operate in parallel to recover the connection A. If peer B should fail during the recovery of A, the remaining peer C will complete the recovery of A and then proceed to recover peer B, including any recovery which B was doing for A as indicated by B's ownership of UOWDs on A's unit of work list header.

What has been described above is the processing performed by surviving queuing subsystems with respect to a single application structure. In general, the failed queuing subsystem may have been connected to multiple application structures, for example structure 1 and 2. If a surviving queuing subsystem is also connected to both structures 1 and 2, it receives two notifications from XES, one for structure 1 and another for structure 2. The surviving queuing subsystem in this case is able to perform the recovery processing (as described above) in parallel for the shared queues that map to structure 1 and structure 2.

This results in the ability to recover a multiplicity of shared queues in parallel, the set of shared queues distributed over a set of application structures provided a surviving peer is connected to the same set (or a subset) of the structures to which the failing queuing subsystem had a connection.

What has been described is a method and system for communicating unit of work information between a plurality of message queuing subsystems. The unit of work state information being provided either through the use of keys, or explicitly through Unit of Work Descriptors stored in the administrative structure. This communication of unit of work information means that in the event of failure of a message queuing subsystem or its communication with the shared queues, other message queueing subsystems can progress the active units of work without reference to the failing subsystem's log data or waiting for the failed queuing subsystem to restart, so improving message availability. The maintenance of the list header information map means that the queuing subsystem performing the recovery can rapidly find any inflight units of work in progress at the time of failure, and back them out without the overhead of explicitly maintaining in a shared place the list of messages in the unit of work. A plurality of message queuing subsystems 20, 21 interface to the application programs and are coupled together through one or more coupling facilities 22. The functioning of the subsystems 20 and 21 and the coupling facility 22 are illustrative of the functions to be performed in communicating message data between the application programs to which the subsystems interface. The message data is communicated in shared queues between the message queuing subsystems by means of the data structures 24 contained in the coupling facility. The application structure 24 lists shared queues to which each message queuing subsystem is connected and the administrative structure 25 lists unit of work descriptors describing operations performed by the queuing subsystems on the shared queues for units of work which have reached a syncpoint operation. A connection failure between a queuing subsystem and a shared queue is provided to the remaining queuing subsystems connected to the shared queue. The remaining queuing subsystems operate in parallel to interrogate the listed work descriptors so as to identify and to share between them the units of work active in the failed connection, and each of the said remaining subsystems recovers its share of the units of work active in the failed connection.

The solution described above includes using a structure interest map in a second phase of recovery, to identify the Coupling Facility list structures to which a resource manager (queuing subsystem) was connected. The second phase of recovery is carried out when a resource manager of the group is connected to the relevant list structures. In an alternative embodiment, a more proactive recovery scheme is used which involves one or more resource managers within the group referring to the structure is interest map to determine whether additional connections should be established. In this embodiment, if a failed resource manager performed uncommitted operations in relation to a list structure to which no other resource managers were connected, other resource managers within the group will establish a connection and perform the required recovery.

What is claimed is:

1. A method for recovering from failures affecting a resource manager within a group of resource managers, wherein the resource managers within the group have access to a shared resource via which remote resource managers communicate with the resource managers within the group, the shared resource including data storage structures to which resource managers within said group connect to send and receive communications, the method comprising:

storing, within a first data storage structure of the shared resource, unit of work descriptors for operations performed in relation to said shared resource by the resource managers in said group;

sending a notification of a connection failure between a second data storage structure of the shared resource and a first resource manager within said group, the notification being sent to the remaining resource managers within the group which are connected to the second data storage structure;

one or more of said remaining resource managers accessing said first data storage structure and analysing the unit of work descriptors to identify the units of work relating to the second data storage structure that were being performed by the first resource manager when the connection failure occurred; and said one or more remaining resource managers recovering the identified units of work.

2. A method according to claim 1 wherein, if there are no remaining resource managers connected to the second data storage structure after said connection failure, said notification is sent to a remaining resource manager when that resource manager connects to the second data storage structure.

3. A method according to claim 1 wherein, if there are no remaining resource managers connected to the second data storage structure after said connection failure, the failed resource manager determines when it is restarted whether any other resource manager has performed recovery for its units of work relating to the second date storage structure and, upon determining that no resource manager has performed said recovery, the restarted resource manager recovers said units of work.

4. A method according to claim 1, wherein all remaining resource managers within the group which are connected to the second data storage structure respond to said notification by attempting to access said first data storage structure to identify units of work to recover, and the method includes the further steps of:

responsive to a first remaining resource manager identifying a unit of work to recover, said first remaining resource manager attempting to set a flag for said unit of work;

responsive to successfuly setting said flag, assigning recovery responsibility for said unit of work to said first remaining resource manager; and refusing to assign recovery responsibility for said unit of work to said first remaining resource manager if said flag has been set by another remaining resource manger.

5. A method according to claim 4, including the further step of:

responsive to said flag having been set by another remaining resource manager, said first remaining resource manager attempting to identifying a further unit of work to recover and attempting to set a flag for said identified further unit of work.

6. A method according to claim 4, including the following steps in response to a connection failure between the second data storage structure of the shared resource and said first remaining resource manager during recovery of said unit of work:

sending a notification of said connection failure to the remaining resource managers within the group which ore connected to the second data storage structure;

one or more of said remaining resource managers accessing said first data storage structure and analysing the unit of work descriptors to identify the units of work relating to the second data storage structure that were being performed by the first remaining resource manager when the connection failure occurred; and said one or more remaining resource managers recovering the identified units of work.

7. A method according to claim 1, wherein the unit of work descriptors include:

a unit of work identifier;

an identification of messages put or retrieved within the unit of work;

a status for the unit of work; and a sequence number.

8. A method according to claim 1, wherein the shared resource is a coupling facility list structure, the second data storage structure is a coupling facility list structure in which a coupling facility list header represents a shared access message queue, and the first data storage structure is an administration list structure of the coupling facility for storing unit of work descriptors.

9. A method according to claim 8, including storing within the coupling facility, for each resource manager within the group, a list header information map representing the set of shared access message queues within the second data storage structure for which the resource manager has performed some work.

10. A method according to claim 9, including reading said list header information map during recovery to identify the set of shared access message queues within the second data storage structure for which the failed resource manager has performed some work.

11. A method according to claim 1, including storing within the shared resource a structure interest map identifying the set of data storage structures to which respective resource managers within said group are connected.

12. A method according to claim 11, wherein the step of recovering the identified units of work is a first recovery phase and wherein the method includes a second recovery phase comprising the steps of:
reading the structure interest map for the failed resource manager to identify the set of data storage structures to which the failed resource manager was connected at the time of said connection failure; identifying any operations performed by the failed resource manager on said set of data storage structures which were not recovered in the first recovery phase; and
one or more of said remaining resource managers than backing out said unrecovered operations.

13. A method according to claim 12, wherein the method includes setting a key for operations performed in relation to the shared resource, the key identifying the resource manager which performed the operation, and wherein the identification of operations performed by the failed resource manager comprise checking said keys for unrecovered operations performed in relation to any of said set of data storage structures.

14. A method according to claim 1, wherein a single unit of work represented by a unit of work descriptor may include operations performed in relation to a plurality of data storage structures, and wherein the partial units of work corresponding to said operations are recovered by different ones of said remaining resource managers within the group.

15. A method for recovering from failures affecting a resource manager within a group of resource managers, wherein the resource managers within the group have access to a shared resource, the shared resource including data storage structures to which resource managers within said group connect to perform operations in relation to data held in said shared resource, the method comprising:
storing, within a first data storage structure of the shared resource, unit of work descriptors for operations performed by the resource managers in said group in relation to data held in said shared resource;
sending a notification of a connection failure between a second data storage structure of the shared resource and a first resource manager within said group, the notification being sent to the remaining resource managers within the group which are connected to the second data storage structure;
one or more of said remaining resource managers accessing said first data storage structure and analysing the unit of work descriptors to identify the units of work relaxing to the second data storage structure that were being performed by the first resource manager when the connection failure occurred; and
said one or more remaining resource managers recovering the identified units of work.

16. A method according to claim 15, wherein the data storage structures of said shared resource include data storage structures which contain shared message queues and said operations performed in relation to said shared resource include putting messages onto a shared message queue and retrieving messages from a shared message queue, for communication between a remote resource manager and resource managers within said group.

17. A method according to claim 16, wherein the unit of work descriptors include:
a unit of work identifier;
an identification of messages put or retrieved within the unit of work;
a status for the unit of work; and
a sequence number.

18. A method according to claim 16, wherein the operations of putting messages onto a shared queue and retrieving messages from a shared queue are performed under transactional scope such that a message which is put is only available to resource managers other that the resource manager putting the message after commitment of the put operation and a message which is retrieved is only available to the retrieving resource manager after commitment of the retrieval operation, and wherein said stored unit of work descriptors identify each of the following:
units of work that were uncommitted but for which a decision to commit had been made when the failure occurred;
unit of work that were uncommitted but for which a decision to abort had been made when the failure occurred; and
units of work for which no commit or abort decision had been made when the failure occurred; and wherein recovering the identified units of work comprises:
committing message put and retrieval operations for which a decision to commit had been made;
backing out message put and retrieval operations for which a decision to back out had been made; and
backing out message put and message retrieval operations for which no commit or abort decision had been made.

19. A distributed data precessing system including:
a plurality of resource managers;
a shared access resource including data storage structures to which the resource managers connect to send and receive communications to and from remote resource managers, the shared access resource including:
means for storing within a first data storage structure of the shared resource, unit of work descriptors for operations performed in relation to said shared resource by the resource managers in said plurality; and
means for sending a notification of a connection failure between a second data storage structure of the shared resource and a first resource manager within said plurality, the notification being sent to the remaining resource managers Within the plurality which are connected to the second data storage structure; wherein said remaining resource managers include:
a means for accessing said first data storage structure and analysing the unit of work descriptors to identify the units of work relating to the second data storage structure that were being performed by the first resource manager when the connection failure occurred; and means for recovering the identified units of work.

20. A computer program product comprising program code recorded on a machine-readable recording medium, the program code comprising the following set of components:

a plurality of resource managers;

a shared access resource manager including program code for managing storage and retrieval of data within data storage structures to which the resource managers connect to send and receive communications to and from remote resource managers, the shared access resource manager including:

means for storing, within a first data storage structure of the shared resource, unit of work descriptors for operations performed in relation to said shared resource by the resource managers in said plurality; and means for sending a notification of a connection failure between a second data storage structure of the shared resource and a first resource manager within, said plurality, the notification being sent to the remaining resource managers within the plurality which are connected to the second data storage structure; wherein said remaining resource managers include:

means for accessing said first data storage structure and analysing the unit of work descriptors to identify the units of work relating to the second data storage structure that were being performed by the first resource manager when the connection failure occurred; and means for recovering the identified units of work.

* * * * *

UNITED STATES PATENT AND TRADEMARK OFFICE
CERTIFICATE OF CORRECTION

PATENT NO. : 6,842,763 B2
DATED : January 11, 2005
INVENTOR(S) : Paul Kettley et al.

It is certified that error appears in the above-identified patent and that said Letters Patent is hereby corrected as shown below:

Column 13,
Line 65, replace "relaxing" with -- relating --.

Column 14,
Line 44, replace "prccessing" with -- processing --.

Signed and Sealed this

Third Day of January, 2006

JON W. DUDAS
*Director of the United States Patent and Trademark Office*